Nov. 19, 1929.  E. V. GODFREY  1,736,589
WRINGER
Filed June 16, 1928
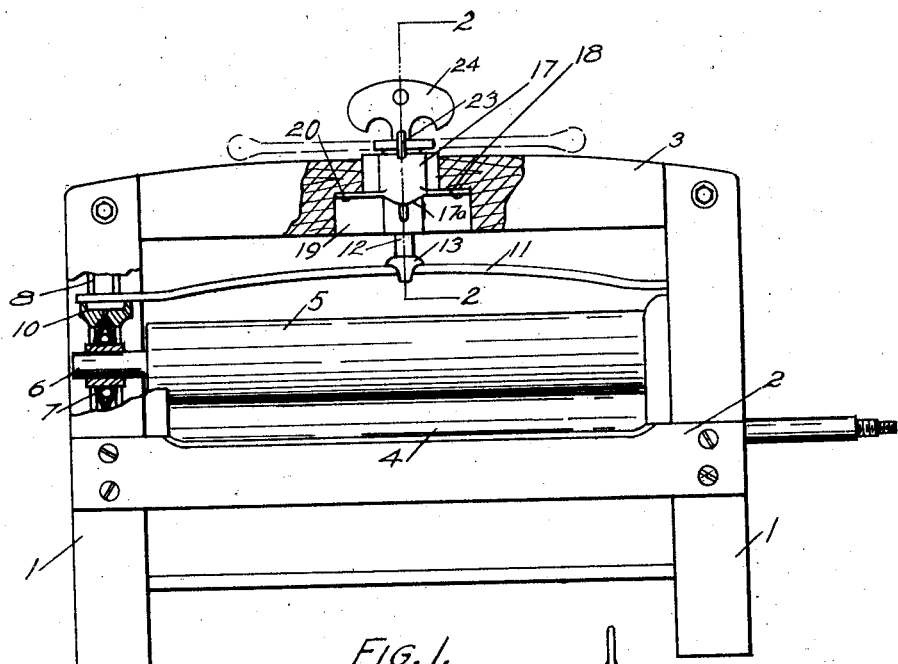
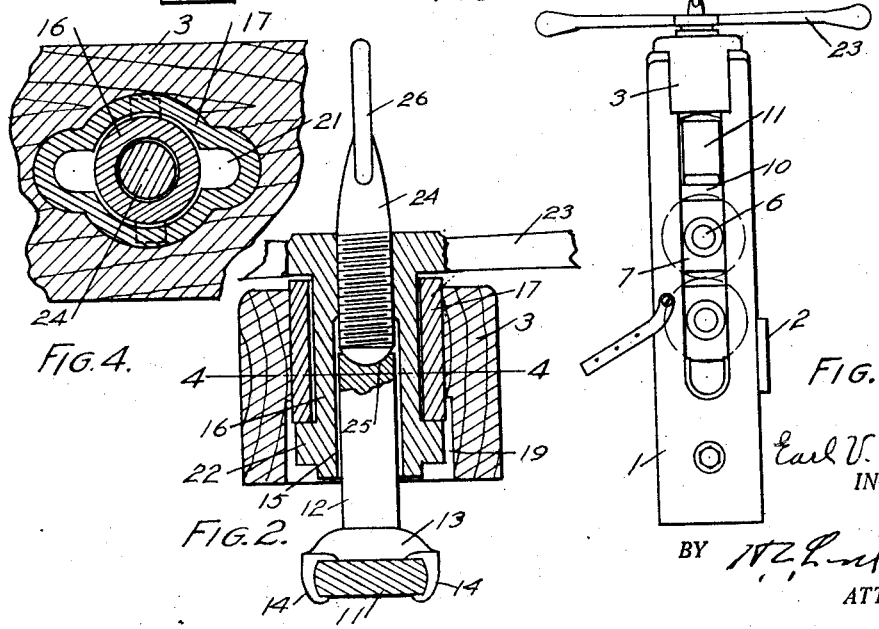
FIG. 1.
FIG. 4.
FIG. 2.
FIG. 3.
Earl V. Godfrey
INVENTOR.
BY
ATTORNEYS.

Patented Nov. 19, 1929

1,736,589

UNITED STATES PATENT OFFICE

EARL V. GODFREY, OF GIRARD TOWNSHIP, ERIE COUNTY, PENNSYLVANIA, ASSIGNOR TO LOVELL MANUFACTURING COMPANY, OF ERIE, PENNSYLVANIA, A CORPORATION OF PENNSYLVANIA

WRINGER

Application filed June 16, 1928. Serial No. 285,978.

The present invention is designed to improve the manner of mounting the spring and connecting it with its tension-adjusting mechanism. Features and details of the invention will appear from the specification and claims.

A preferred embodiment of the invention is illustrated in the accompanying drawings as follows:—

Fig. 1 shows a front elevation of the wringer, partly in section, to better show construction.

Fig. 2 a section on the line 2—2 in Fig. 1.

Figure 3 an end view of the wringer.

Fig. 4 a section on the line 4—4 in Fig. 2.

The frame comprises side stiles 1, connecting boards 2 and a top rail 3. It has the lower wringer roll 4 and upper wringer roll 5, the upper wringer roll having a shaft 6 mounted in bearings 7. The bearings are slidingly guided in slots 8 arranged in the side stiles. The lower roll has a similar fixed bearing (not shown) and the upper roll is provided with bearings of similar construction at each end.

Arranged upon the bearings 7 is a block 10. A spring 11 which extends across the wringer under the top rail rests upon the blocks 10 and puts the rolls under tension.

A pin 12 is provided with a base 13 resting on the center of the spring and the base is secured and fixed on the spring by clamping fingers 14 which are bent into clamping engagement on the spring.

The pin 12 extends into a socket 15 in a releasing sleeve 16. The releasing sleeve is arranged in a fixed sleeve 17. The sleeve 17 is provided with a flange 18 which is arranged in an opening 19 extending upwardly in the bottom of the top rail and is secured to the top rail by screws 20 extending through the flange. The fixed sleeve 17 has axial slots 21 extending through it and the releasing sleeve is provided with shoulders 22 which are adapted to pass through the slot 21 and as they are turned lock the sleeve in place, the bottom of the fixed sleeve being preferably provided with a cam surface 17$^a$ on which the shoulder 22 operates putting the normal tension on the spring.

Handles 23 are provided extending from the releasing sleeve above the top rail. This releasing mechanism operates in the manner of a well-known device of this character. As the releasing member is turned, the shoulders 22 are brought into register with the grooves 21 and thus release the tension on the spring and rolls.

An adjusting screw 24 extends through the sleeve and operates on a socket 25 in the upper end of the pin 12, the screw being provided with the usual wings 26 to facilitate the operation of the screw.

It will be noted that the pin 12 which is secured to the spring extending up into the socket 15 locks the spring in place and thus simplifies the mounting of the spring in the wringer and the assembling of the wringer.

What I claim as new is:—

1. In a wringer, the combination of a frame comprising side stiles having bearing-receiving slots therein and a top bar secured to the side stiles; wringer rolls; bearings for the upper wringer roll arranged in said slots; a tension spring resting on said bearings; a fixed sleeve on the top bar; a releasing sleeve slidingly mounted in the fixed sleeve, one of said sleeves having a slot and the other a shoulder, the shoulder passing through the slot to release the sleeve and being adapted to lock the same when the shoulder and slot are out of register; a pin secured on the spring and extending into the releasing sleeve; and means in the releasing sleeve bearing on the pin.

2. In a wringer, the combination of a frame comprising side stiles having bearing-receiving slots therein and a top bar secured to the side stiles; wringer rolls; bearings for the upper wringer roll arranged in said slots; a tension spring resting on said bearings; a fixed sleeve on the top bar; a releasing sleeve slidingly mounted in the fixed sleeve, one of said sleeves having a slot and the other a shoulder, the shoulder passing through the slot to release the sleeve and being adapted to lock the same when the shoulder and slot are out of register; a pin secured on the spring and extending into the releasing sleeve; and a screw threaded into the releasing sleeve and operating on the pin.

In testimony whereof I have hereunto set my hand.

EARL V. GODFREY.